United States Patent [19]
Gschweitl

[11] Patent Number: 5,913,427
[45] Date of Patent: Jun. 22, 1999

[54] METHOD FOR DETERMINING THE PURITY OF PROCESSED WASTE GLASS

[75] Inventor: Karl Heinz Gschweitl, Grosspesendorf, Austria

[73] Assignee: Binder + Co. Aktiengesellschaft, Gleisdorf, Austria

[21] Appl. No.: 08/906,574

[22] Filed: Aug. 5, 1997

[30] Foreign Application Priority Data

Aug. 21, 1996 [AT] Austria .................................. 1505/96

[51] Int. Cl.$^6$ ...................................................... B07C 5/00
[52] U.S. Cl. ............................ 209/10; 209/577; 209/639; 209/930
[58] Field of Search .................................... 209/552, 559, 209/562, 563, 564, 576, 577, 930, 10, 639

[56] References Cited

U.S. PATENT DOCUMENTS

| 4,765,484 | 8/1988 | Klumparendt | 209/577 |
| 5,314,071 | 5/1994 | Christian et al. | 209/581 X |

FOREIGN PATENT DOCUMENTS

| 400906 | 4/1996 | Austria . | |
| 3731402 | 12/1988 | Germany | 209/577 |

Primary Examiner—Tuan N. Nguyen
Attorney, Agent, or Firm—Collard & Roe, P.C.

[57] ABSTRACT

A method for determining the purity of processed waste glass, in which the sample quantity is taken from the processed waste glass stream and is deposited preferably in one layer and is allowed to flow over a free-falling track and the foreign matter according to non-ferrous metals and opaque foreign particles are blown out and weighed according to a separate detection of said groups of foreign matter and for the determination of the quality of the sample the ratios of non-ferrous metal additions to the entire sample quantity and the opaque foreign particles to the entire sample quantity are determined, with said groups of foreign matter being jointly weighed continuously and the weight increases, depending on the group of foreign matter—non-ferrous metals or opaque foreign particles—which was detected immediately prior to the weight increase, being added to this group of foreign matter. In order to allow the determination of the share of foreign matter in the sample precisely it is provided that prior to the detection of the aforementioned groups of foreign matter glass particles are sorted out in a first step from the material stream flowing over the free-falling track and the pieces which are evaluted at first as foreign matter, optionally with an intermediate storage, are freed from any adhering residues of labels and the like and are thereafter allowed to flow over a free-falling track again, with glass pieces and the foreign matter being mutually separated and are allocated depending on the detection to the opaque foreign matter or the non-ferrous metals.

5 Claims, 3 Drawing Sheets

METHOD FOR DETERMINING THE PURITY OF PROCESSED WASTE GLASS

BACKGROUND OF THE INVENTION

1. Field of the Invention

The invention relates to a method for determining the purity of processed waste glass.

2. Description of the Prior Art

A high degree of freedom from foreign matter must be ensured in the processing of waste glass. Accordingly, the processed waste glass may contain per metric ton a maximum of 20 g of opaque foreign bodies such as ceramics, porcelain or stones and a maximum of 5 g of non-ferrous metals. These high degrees of purity are necessary as currently already up to 95% waste glass is added to the melt. These high degrees of purity must be guaranteed by waste glass processors and must be proved by samples of the processed waste glass. As these samplings occur in regular intervals during the processing and as a result of the very low permissible impurifications, in particular by ceramics, stones, porcelain and non-ferrous metals, it is necessary to have large quantities of samples. As a result of this the analysis of the processed waste glass is very costly.

A method of the kind mentioned above has become known from AT 400 906 B. In this known method the sample quantity is allowed to flow over a free fall track and opaque foreign matter such as ceramics, stone and porcelain portions (referred to below as CSP parts) as well as non-ferrous parts (referred to below as NF parts)which are recognised by the sensors are blown out. Both the CSP parts as well as the NF parts are collected in a foreign matter collection container and the pure glass parts are collected in a pure glass collection container. By the detection of the weight increase of the foreign matter collection container and the previous response of either a sensor responding to NF parts or a sensor responding to CSP parts the subsequent weight increase of the foreign matter collection container is added to the respective group of foreign matter, as a result of which the masses of CSP and NF parts contained in the sample is detected and can be brought into relationship to the mass of glass parts contained in the sample.

It has been noticed that in some cases the residues of labels sticking to pieces of glass, in particular those made from metal-coated paper, lead to a separation of the part as a NF part or an opaque part and is separated as foreign matter although this part could certainly be regarded as a valuable substance and could be used.

SUMMARY OF THE INVENTION

It is the object of the present invention to avoid this disadvantage and to provide a method of the kind mentioned above which allows a proper screening of the individual parts of the sample.

This is achieved in accordance with the invention by a method for determining the purity of processed waste glass, which comprises the steps of taking a sample quantity from a stream of processed waste glass comprising pure glass particles and particles of foreign matter selected from the group consisting of non-ferrous metals, opaque particles, and glass particles with adhering residues of paper and allowing the sample quantity to flow over a free-falling track. The particles of foreign matter are detected as they flow over the free-flowing track and the pure glass particles are separated from residuals containing glass particles with adhering residues of paper by blowing the detected particles out of the flowing sample quantity in a first separation step. The blown-out residuals are processed to remove adhering residues of paper from the glass particles with adhering residues of paper, and the processed residuals blown out in the first separation step are allowed to flow over a free-falling track. The particles of non-ferrous metals and opaque particles are determined, blown out and continuously jointly weighed, the weight increase depending on the group of foreign matter, i.e. non-ferrous metals or opaque particles, which was detected immediately prior to the weight increase is added to the corresponding group of foreign matter, and the weight ratios of the non-ferrous metal particles and opaque particles to the entire sample quantity are determined.

As a result of the proposed method it is ensured that the parts classified from the sample at first as foreign matter are relieved from any attached label residues and that only thereafter are the pure glass parts and the foreign matters separated from one another. The assignment of the separated foreign matters to one of the two groups, namely CSP parts and NF parts, occurs in the known manner by detection of the weight increase of the foreign matter collection container and the assignment to the group whose sensor responded immediately beforehand.

It is an advantage use a device which is provided with a relatively simple arrangement. It is principally also possible, however, to use separate sorting devices with free fall tracks for the entire sample and for the parts thereof which are classified at first as foreign matter.

It is a further object of the present invention to provide a device to perform the method in accordance with the invention.

Such a device comprises a free-falling track allowing a sample quantity of processed waste glass comprising pure glass particles and particles of foreign matter selected from the group consisting of non-ferrous metals, opaque particles, and glass particles with adhering residues of paper to flow thereover. Respective sensors detect the particles of non-ferrous metals and opaque particles as they flow over the free-flowing track, and nozzles controlled by the sensors blow the detected particles out of the flowing sample quantity in a first separation step. The nozzles are arranged in rows extending transversely to the free-falling track along the width thereof. A separate collecting container with a weighing device is arranged to receive the pure glass particles from the free-falling track and an intermediate storage container is arranged to receive the blown-out residuals containing glass particles with adhering residues of paper. A device for processing the blown-out residuals removes the adhering residues of paper from the blown-out particles, and conveying means are provided for conveying the blown-out residuals to the removing device, and for conveying the particles from which the adhering residues of paper have been removed to the free-falling track. Some of the nozzles are controlled by sensors monitoring the free-falling track over which the sample quantity is allowed to flow and other nozzles are controlled by sensors monitoring the free-falling track over which the processed residuals from which the adhering residues of paper have been removed are allowed to flow. The free-falling track is arranged in such a manner that pure glass particles fall into the collecting container. A further container with weighing devices is arranged to receive the blown-out non-ferrous metals and opaque particles, and a computer having inputs is connected to the weighing devices and the sensors.

The proposed measures allow performing the method in accordance with the invention in a very simple manner. Thus it is ensured in the device in accordance with the invention that the entire sample quantity is separated at first into pure glass portions and residual portions, with the residual portions concerning parts which were not clearly recognised as glass parts. These also include glass parts to which label residues adhere and are therefore classified as opaque parts for example.

These residual parts are optionally freed from the label residues after an intermediate storage in a respective device. The residual parts freed from the label residues can then be simply sorted according to glass parts and parts of foreign matter. The assignment of the separated parts of foreign matter can be made in the known manner to the group of CSP parts and the NF parts.

The device for removing the adhering residues of paper may comprise a drum having open ends and whose inner wall is helicoidal and has inwardly projecting ribs, with a burner arranged at the center of the drum. This has the advantage that the removal of the label residues can be effected very rapidly and efficiently. Moreover, it is a smaller burden to the environment than the use of solvents for the destruction of the adhesive film.

The removing device may comprise a glass jet blower for irradiating the glass particles with glass grain. This has the advantage that any burden to the environment can practically be entirely prevented. The glass dust mixed with paper dust received by this method can be easily recycled. For this purpose it is sufficient to separate the small particles which are then supplied to the melt. The paper particles contained therein are incinerated in the melt and are harmless for the quality of the produced glass.

An arrangement of the device which is very simple with respect to its design if a wall extends in a longitudinal direction along the free-falling track and divides the width of the track into the separate parts.

If the sensors for detecting the opaque parts and the sensors for detecting the non-ferrous parts are distributed in spaced-apart rows extending over the entire width of the free-falling track, a very high resolution in is achieved a very simple way and of thus detecting also very small parts, in particular NF parts, of foreign matter such as particles of metallic bottle caps.

It is principally sufficient to arrange only sensors for detecting opaque parts also in the zone of the free fall track which is flowed through by the entire sample quantity. However, such sensors are either provided with an inadequate sensitivity for the detection of very small parts such as fragments of bottle caps or a sufficiently high resolution ratio can not be achieved with them for the detection of such parts.

BRIEF DESCRIPTION OF THE DRAWING

The invention shall now be explained in closer detail by reference to the enclosed drawing, wherein.

DETAILED DESCRIPTION OF PREFERRED EMBODIMENTS

Figure 1:
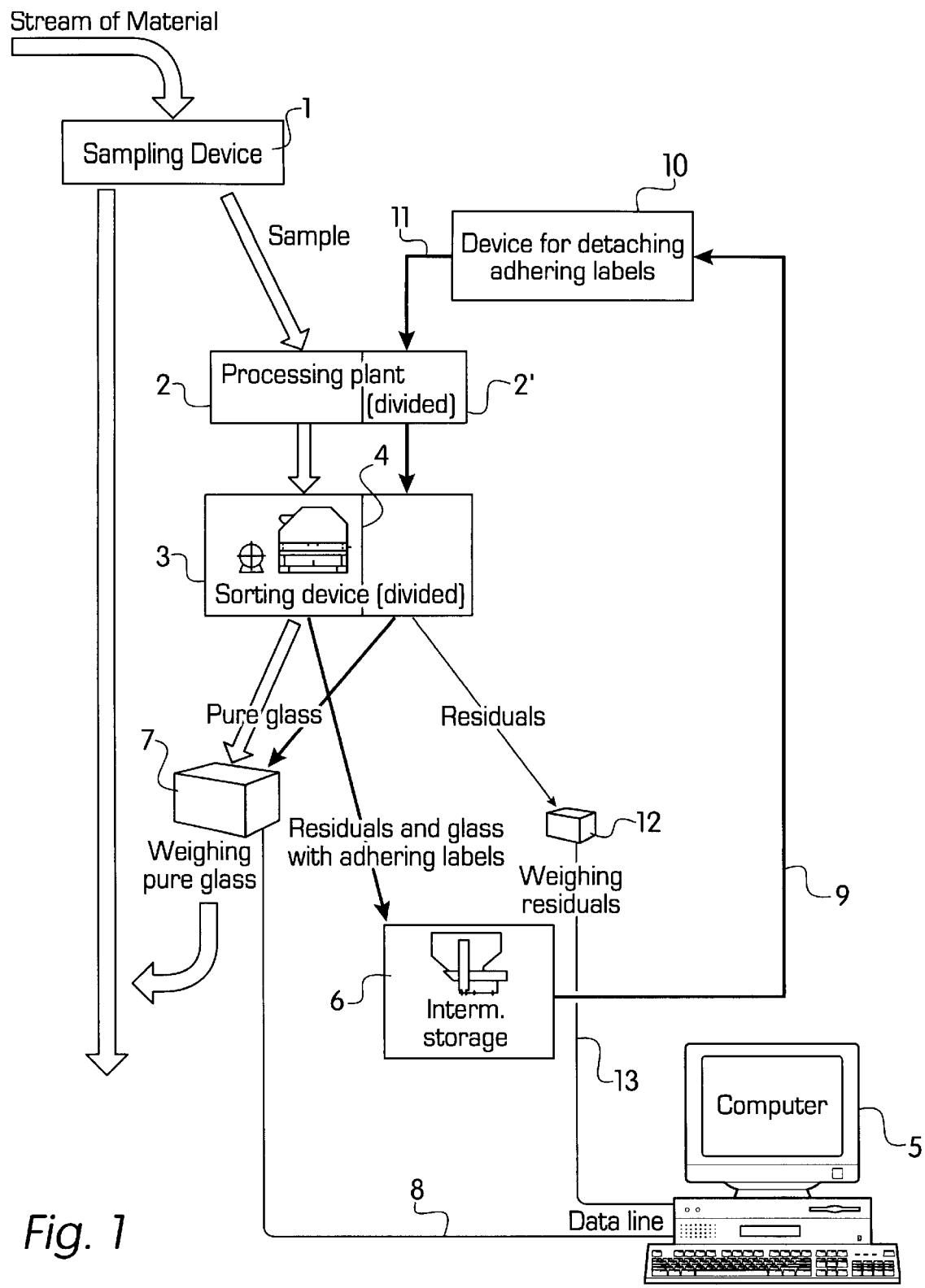
FIG. 1 schematically shows a device for performing the method in accordance with the invention.

The method in accordance with the invention is now explained in closer detail by reference to FIG. 1.

The taking of samples from the stream of waste glass which is cleaned in a waste glass processing plant and the preparation of the samples by drying, sucking off the fine particles and the screening occurs in the same manner as is described in U.S. Pat. No. 5,781,441.

The sample is taken with a sampling device 1 from a stream of the processed waste glass which leaves the waste glass processing plant and is supplied to a processing plant 2. The sample is dried there and the fine particles are sucked off or screened off. Thereafter the sample is supplied to a sorting device 3.

The sorting device 3 is provided with a chute over which the sample slides in a single position. The material stream of the sample passes two rows of sensors which are arranged distributed over the entire width of the chute and of which the one are used for detecting opaque foreign particles and the other for detecting non-ferrous particles. The chute is subdivided by a wall 4 extending in the longitudinal direction into two unevenly wide sections.

In a first passage the sample is exclusively issued to the wider part of the chute of sorting device 3.

A free fall track follows the chute of the sorting device 3. If one of the sensors recognises an impurification such as NF parts or CSP parts, the same will emit a pulse signal via a data line to computer 5 corresponding to the type of the impurification and it will control, with a time delay, the blower nozzles which are arranged in the zone of the free fall track assigned to the wider portion of the chute in a row extending transversally to the free fall track, as a result of which all parts of the sample stream which are not clearly recognised as glass are blown out from the glass stream. The grain sizes of the impurifications can also be calculated from the duration of the individual pulse signals to the computer.

A considerable part of the particles blown out from the sample stream concern glass parts to which parts of labels adhere.

The blown-out parts reach a collecting container 6 for residual parts, whereas the glass parts reach a pure glass collecting container 7. Said pure glass collecting container 7 is in connection with a weighing device which is connected with the computer 5 via signal lines 8.

The collecting container 6 for the residual parts is connected by way of a conveyor device 9 with a device 10 which is used to detach the labels from the glass parts. Such a device can be formed by a drum which is provided on its inner side with a spiral projecting into its interior and where a burner is arranged in its centre.

The device 10 can also be formed by a chamber in which a glass jet blower is located. The labels are mechanically rubbed off from the shards by radiating the shards with small glass balls. The glass dust arising in this process can be treated again after sucking off larger paper particles. The minute particles, which can be mixed with paper particles, can easily be melted.

On the output side the device 10 is connected by way of a conveying device 11 with a processing plant 2' which is arranged substantially the same as the processing plant 2 for the sample. The processed material is issued to the narrower part of the chute of the sorting device 3.

In the zone, which is assigned to the narrower zone of the chute, of the free fall track arranged downstream thereof blower nozzles are provided in a row arranged transversally to the free fall track, which nozzles blow out into a foreign particle container 12 foreign parts 12 such as CSP and NF parts which are detected by the sensors. The foreign particle container 12 is connected with a weighing device which is connected with the computer 5 by way of a signal line 13.

In this way the computer 5 can determine the change in weight as a result of the blown-out impurities and assign these to the type of the impurity (NF or CSP) and add the respective last change in weight co the respective group of impurities. This allows precisely determining the mass of the sorted NF parts of the sample and those of the CSP parts of the sample.

As the computer 5 is also connected with the weighing device of the pure glass collecting container 7, it also determines the mass of the pure glass of a sample and can relate the mass of the sorted NF parts and CSP parts to the mass of the pure glass.

Figure 2:
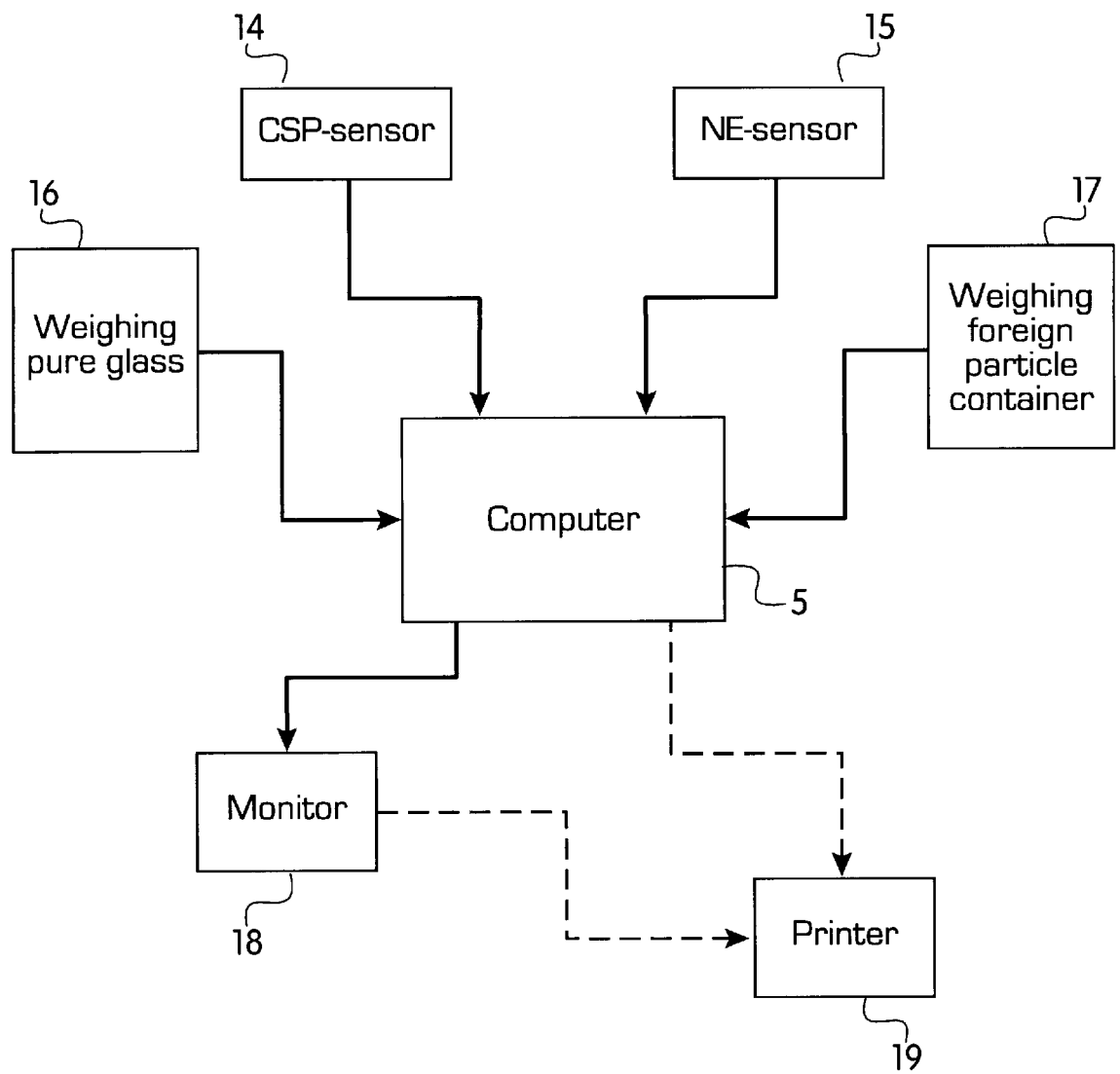
FIG. 2 shows a block diagram of the evaluation device.

As can be seen from FIG. 2, computer 5 is connected on the input side with the sensors 14 and 15 for detecting CSP parts or NF parts and with the weighing devices 16, 17 for detecting weight increases of the pure glass container 7 and the foreign particle container 6. On the output side it is connected with a screen 18 and a printer 19.

For evaluation, the weight increases of collection container 6 which are stored in computer 5 are placed in relationship, separated according to NF and CSP impurities over an adjustable defined period t, preferably between 1 and 30 minutes, to the entire sample quantity which is put through in this period. This sample quantity is composed of the weight increases which occurred in the defined period t as a result of the NF and CSP parts in the collecting container 6 plus the increases in container 7. The results of these evaluations are displayed on a screen 18 and can be printed out at any time by printer 19. In any case, they remain stored in the computer.

Figure 3:
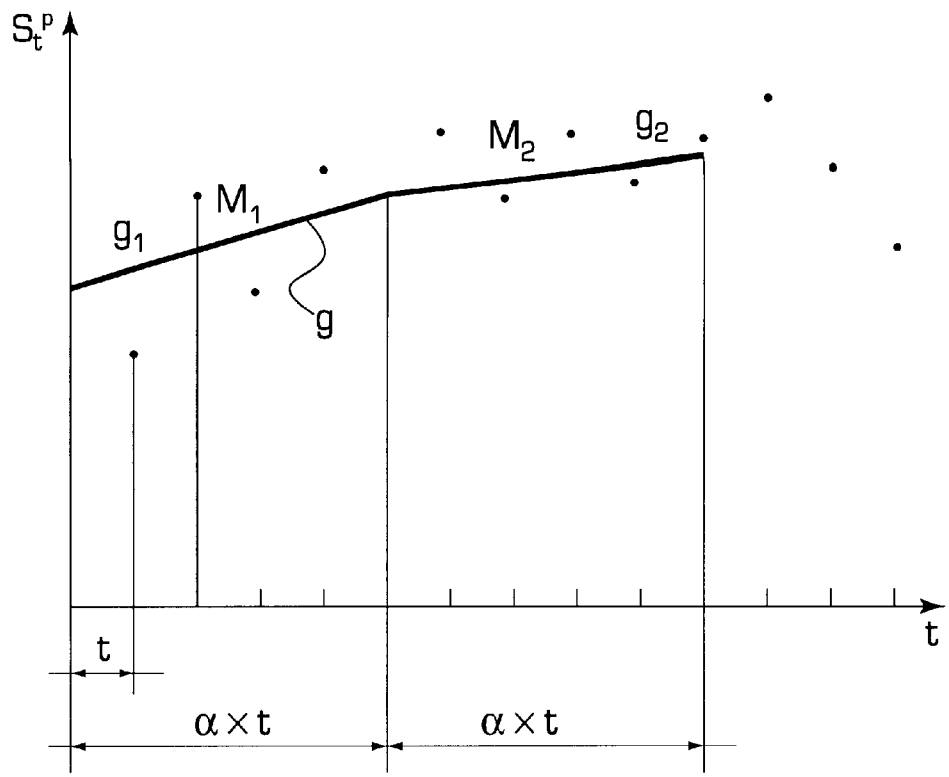
FIG. 3 shows a diagram to explain the trend analysis.

For the trend analysis it is provided, as is shown in FIG. 3, that a certain number a of between 4 and 10 successive evaluation results of such evaluation cycles are recorded via a time axis as a cluster of points of NF/sample quantity as well as CSP/sample quantity ratios and a regression line g is placed through both clusters of points by means of a regression function. The positive or negative gradients of these lines show the trend towards a deterioration or improvement of the purity of the sample during these evaluation cycles. It is also displayed on a screen and can be printed out.

In a simplified trend analysis it is also possible to show, instead of the ratios between the NF weight increase or CSP weight increase to the sample quantity which is determined during these evaluation cycles, only the number of the pulse signals for NF and/or CSP parts during the period t to the sample quantity as ratio(s) and to include them, as described above, in a trend analysis.

It is further provided that also the trends of at least the preceding evaluation are displayed during the current trend display.

It is also provided to write the mean values of the results from the individual evaluation cycles into a memory. This memory should have space for between 100 and 500 evaluation cycles. The memory is always updated again by including the last value and rejecting the oldest value. In this way an average plant value AW is to be determined.

At least the mean values detected within the last hour in the individual periods t shall be used for the determination of the plant value AW and the respective mean value is to be calculated. The plant value AW can be calculated from all mean values located in the memory of computer 5 during longer operation.

Figure 4:
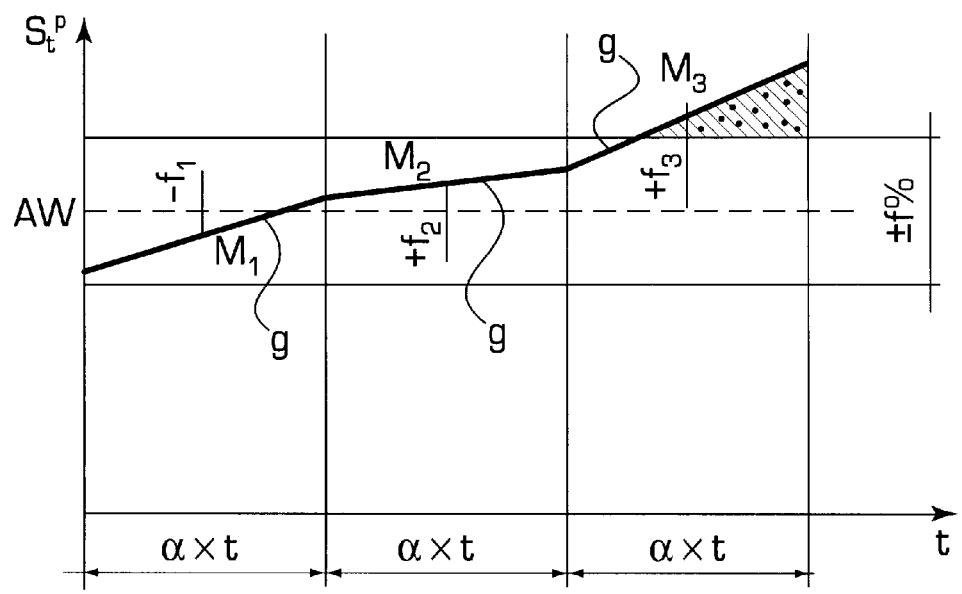
FIG. 4 shows a diagram to explain the application of the trend analysis.

As is shown in FIG. 4, warning thresholds can be determined on the basis of the plant value AW which are under or over the plant value AW by the value ±f.

During the sample taking cycle the deviation of the central point M of the last calculated regression line g from the experimental value AW is shown in percent.

This percentage rate reflects the quality of the material quantity sampled in the last a time units (FIG. 4).

Upon exceeding the predetermined warning thresholds the computer will intervene in the processing process for waste glass (A) by way of control units, e.g. by reducing the supplied quantity in a waste glass processing plant (not shown).

A manual inspection of a sample of the material collected in container 7 is favourably performed in the case of exceeding or falling below a warning threshold. If an unacceptably bad quality of the sample is confirmed, for example, this can be corrected by an intervention in the operation of a waste glass processing plant (not shown), which is provided upstream, within the terms of a reduction of the throughput of waste glass to be prepared. On the other hand, on falling below the lower warning threshold and after confirming the respectively high quality of the sample by a manual inspection the throughput of the waste glass processing plant can be increased in order to make its operation more economical.

During the manual inspection the glass particles which are also blown out are separated with the foreign materials and divided according to experimental values among the two groups of foreign materials, namely NF and CSP parts. More glass particles are blown out with the very light NF parts such as bottle caps than with the heavier CSP parts.

At the end of each sample a program will calculate the average of all deviations and will thus lead to a statement on the purity of the entire sample. This is printed out and is used for documentation.

In order to also use this kind of sample analysis to make precise statements on the quantity of the impurities contained in the sample (in particular whether the material quality corresponds to the predetermined standards or experimental values), it is necessary to include comparative values.

For this purpose the weight ratios or standardised number of impacts relating to the entire sample quantity and the entire sample period of a large number of preceding, duly concluded sample takings are written into a memory. The memory can be updated after each sample taking by including the last value and rejecting the oldest one. This function can also be stopped upon reaching a stable condition.

I claim:

1. A method of determining the purity of processed waste glass, which comprises the steps of
    (a) taking a sample quantity from a stream of processed waste glass comprising pure glass particles and particles of foreign matter selected from the group consisting of non-ferrous metals, opaque particles, and glass particles with adhering residues of paper,
    (b) allowing the sample quantity to flow over a free-falling track,
    (c) detecting the particles of foreign matter as they flow over the free-flowing track and separating pure glass particles from residuals containing glass particles with adhering residues of paper by blowing out the detected particles of the flowing sample quantity in a first separation step,
    (d) processing said blown-out residuals to remove adhering residues of paper from said particles,
    (e) allowing the processed residuals blown out in said first separation step to flow over a free-falling track, (f) determining particles of non-ferrous metals and opaque particles and blowing out said particles of foreign matter, (g) continuously weighing said blown out particles of non-ferrous metals and opaque particles jointly, (h) adding the weight increase depending on the group of foreign matter—non-ferrous metals or opaque particles—which was detected immediately prior to the weight increase to the corresponding roup of foreign matter, and (i) determining the weight ratios of the particles of non-ferrous metal and opaque particles to the entire sample quantity.

2. The method of claim 1, wherein the sample quantity is allowed to flow over the free-falling track in a single layer.

3. The method of claim 1, wherein the free-falling track over which the glass particles blown out in said first step from which the adhering residues of paper have been removed are allowed to flow again in a separate zone of the free-falling track over which the sample quantity is allowed to flow to separate pure glass particles and residuals containing glass particles with adhering residues of paper also in said first step.

4. An apparatus for determining the purity of processed waste glass, which comprises (a) a free-falling track allowing a sample quantity of processed waste glass comprising pure glass particles and particles of foreign matter selected from the group consisting of non-ferrous metals, opaque particles, and glass particles with adhering residues of paper to flow thereover, (b) sensors for detecting the particles of non-ferrous metals and sensors for detecting opaque particles, (c) nozzles controlled by the sensors for blowing the detected particles out of the flowing sample quantity in a first separation step, (1) the nozzles being arranged in rows extending transversely to the free-falling track along the width thereof, (d) a collecting container with a weighing device arranged to receive the pure glass particles from the free-falling track, (e) an intermediate storage container arranged to receive the blown-out residuals containing glass particles with adhering residues of paper, (f) a device for processing the blown-out residuals for removing the adhering residues of paper from the blown-out particles, (g) conveying means for conveying the blown-out residuals to the removing device and for conveying the particles from which the adhering residues of paper have been removed to the free-falling track, (h) some of the nozzles being controlled by sensors monitoring the free-falling track over which the sample quantity is allowed to flow, and other nozzles being controlled by sensors monitoring the free-falling track over which the processed residuals from which the adhering residues of paper have been removed are allowed to flow, (i) said free-falling track being so arranged that pure glass particles fall into the collecting container receiving pure glass particles during the first step of separation, (j) a further container with weighing devices arranged to receive the blown-out non-ferrous metals and opaque particles, and (k) a computer having inputs connected to the weighing devices and the sensors.

5. The apparatus of claim 4, further comprising a wall extending in a longitudinal direction along the free-falling track and dividing the width of the track into the separate parts.

\* \* \* \* \*